United States Patent [19]

Otto

[11] 4,043,620
[45] Aug. 23, 1977

[54] RIB-MOUNTED BEARING SEAL

[75] Inventor: Dennis L. Otto, Malvern, Ohio

[73] Assignee: The Timken Company, Canton, Ohio

[21] Appl. No.: 690,189

[22] Filed: May 26, 1976

[51] Int. Cl.$^2$ .................................... F16J 15/32
[52] U.S. Cl. .................................... 308/187.2; 277/95
[58] Field of Search ............... 308/36.1, 187.1, 187.2; 277/27, 95

[56] References Cited

U.S. PATENT DOCUMENTS

| 3,531,168 | 9/1970 | Bainard | 308/187.1 |
| 3,639,016 | 2/1972 | Boorgeois | 308/187.2 |
| 3,858,950 | 1/1975 | Otto | 308/187.1 |

Primary Examiner—Joseph F. Peters, Jr.
Assistant Examiner—Gene A. Church
Attorney, Agent, or Firm—Gravely, Lieder & Woodruff

[57] ABSTRACT

A seal for a tapered roller bearing has a seal case which fits onto the bearing cone and an elastomeric seal element which is bonded to the case and has a primary sealing lip in contact with the front face of the bearing cup. The seal case includes a doubled back axial portion which fits around the thrust rib on the cone and is composed of inner and outer segments joined together at a tight bend. The inner segment embraces the thrust rib and has an inwardly directed radial flange extended from it, this flange being positioned against the cone back face. The outer segment lies against the inner segment immediately beyond the tight bend and has an outwardly directed radial flange which aligns with the inwardly directed flange. The seal element projects outwardly from the outer flange. The axial installation force required to press the axial portion of the seal case over the thrust rib is applied to both flanges and hence is transmitted through both the inner and outer segments. This avoids bell mouthing of the seal case and the accompanying inclination of the seal element. It further improves retention, while permitting the seal case to be pressed over thrust ribs manufactured with liberal tolerances.

15 Claims, 5 Drawing Figures

RIB-MOUNTED BEARING SEAL

BACKGROUND OF THE INVENTION

This invention relates in general to sealing devices and more particularly to seals for antifriction bearings.

Rib-mounted bearing seals are highly compact and extend the length of a bearing only a nominal amount, if at all. They are widely used in connection with tapered roller bearings. The typical rib-mounted seal for a tapered roller bearing has a case which is pressed over the thrust rib of the bearing cone and an elastomeric seal element which is bonded to the case. The seal element possesses a primary lip which bears against the front face of the bearing cup and a dust lip which contacts the surface of the housing bore into which the cup fits. This type of seal forms the subject matter of U.S. Pat. No. 3,006,701 issued Oct. 31, 1961.

While rib-mounted seals possess substantial advantages, primarily due to the high degree of compactness, such seals also increase the cost of the overall bearing installation. This increase in cost resides in the fact that the outside diameter of the thrust rib and the inside diameter of the seal case must be held to within close tolerances. Indeed, the diameter of these surfaces must be such that the press fit which exists between the seal case and thrust rib is between 0.001 and 0.004 inch tight. A tighter press fit causes the seal case to bellmouth, that is flare outwardly at its end (FIG. 1), and this puts less surface area of the seal case in contact with the thrust rib. Retention is therefore reduced. Bell mouthing furthermore inclines the seal element (FIG. 1) such that the sealing lip is withdrawn from the cup front face and may not bear against that face with adequate force. A lesser press fit likewise reduces the retention. While the seal case may be stamped with considerable precision, the close tolerances on the thrust rib are usually obtained by grinding the outside diameter of the thrust rib, and this is an expensive procedure.

SUMMARY OF THE INVENTION

One of the principal objects of the present invention is to provide a seal which may be installed on the thrust rib of a bearing ring to provide a highly compact sealed bearing arrangement. Another object is to provide a seal of the type stated which may be press-fitted over thrust ribs that are manufactured to within liberal tolerances, so that expensive grinding operations are not required for sizing the thrust ribs. A further object is to provide a seal of the type stated, the installation of which does not affect the angular relationship between the seal lips and the surfaces against which they bear. An additional object is to provide a seal of the type stated which may be provided in varying degrees of stiffness without expensive mold changes. Still another object is to provide a seal which is inexpensive to manufacture and easy to install. These and other objects and advantages will become apparent hereinafter.

The present invention is embodied in a seal having a case provided with an axial portion which fits onto a bearing ring. The axial portion does not experience bell mouthing during installation. The invention also consists in the parts and in the arrangements and combinations of parts hereinafter described and claimed.

DETAILED DESCRIPTION

Figure 1:
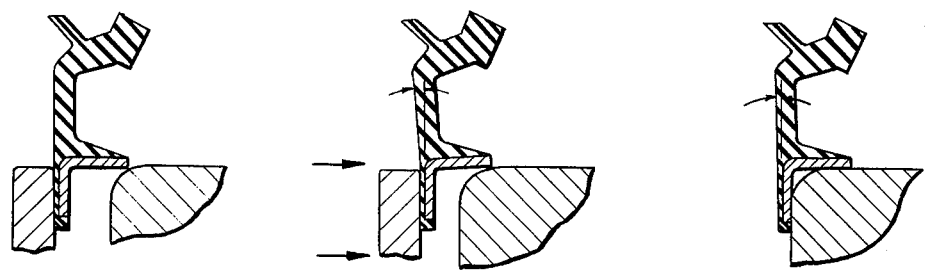
FIG. 1 is a view showing the steps in progression of installing a rib-mounted seal of current manufacture.
Figure 2:
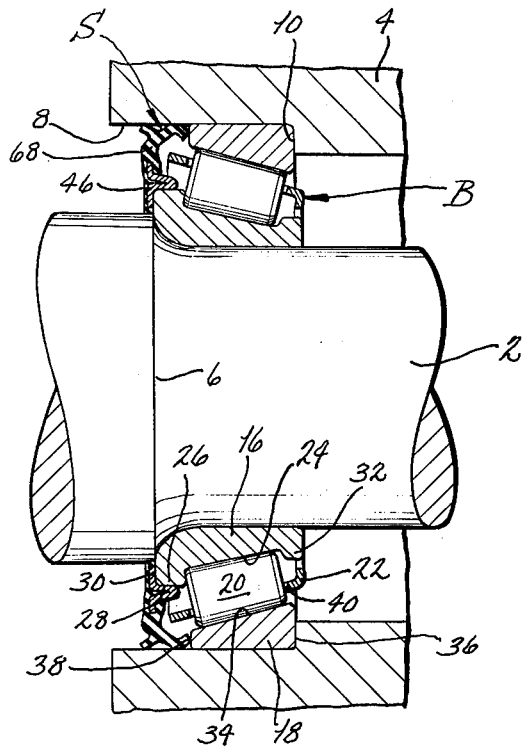
FIG. 2 is a sectional view of a single row tapered roller bearing provided with the rib-mounted seal of the present invention.

Referring now to the drawings, a bearing B (FIG. 2) is located between a shaft 2 and a housing 4 to permit relative rotation between the two with a minimum amount of friction. The shaft 2 extends through the housing 4 and immediately behind the bearing B it is provided with an abutment 6 such as a shoulder or nut. The housing 4 is provided with an outwardly opening housing bore 8 into which the bearing B fits, and this bore terminates at a shoulder 10 against which the bearing B is also positioned. The bearing B is closed by a seal S which is mounted on it adjacent to the shoulder 6 of the shaft 2. The seal S is likewise located within the housing bore 8.

The bearing B is a conventional single row tapered roller bearing and includes four components, namely an inner ring or cone 16, an outer ring or cup 18 encircling the cone 16, a set of tapered rollers 20 located between the cone 16 and cup 18, and a cage 22 which maintains the proper spacing between the rollers 20. The cone 16 encircles the shaft 2, while the cup 18 fits within the housing bore 8.

The cone 16 has an outwardly presented tapered raceway 24 around which the tapered rollers 20 are disposed. At the large diameter end of the raceway 24 the cone 16 is provided with a thrust rib 26 against which the large diameter end faces of the rollers 20 bear. Indeed, the thrust rib 26 axially positions the rollers 20 and prevents them from being expelled from the space between the cup 18 and the cone 16. The thrust rib 26 has a cylindrical outer surface 28 and a back face 30 which bears against the abutment 6 on the shaft 2. At the small diameter end of the raceway 24, the cone 16 has a retaining rib 32 which prevents the rollers 20 and cage 22 from sliding off of the cone 16 when the cone 16 is removed from the cup 18.

The cup 18 is provided with a tapered inwardly presented raceway 34 which is located opposite the tapered raceway 24 of the cone 16 so that the rollers 20 are interposed between and contact the two raceways 24 and 34. At the small diameter end of the raceway 34, the cup 18 has a back face 36 which bears against the shoulder 10 at the end of the housing bore 8. At the large diameter end of the raceway 34, the cup 18 has a front face 38 which is offset from the back face 30 of the cone 16 when the rollers 20 are seated against the two raceways 24 and 34. Due to the taper of the raceway 34, the cup back face 36 is wider than the cup front face 38.

The cage 22, like the rollers 20, fits between the cup 18 and cone 16, and it has pockets 40 in which the rollers 20 are received. These pockets restrain the rollers 20 and maintain the proper spacing between them in the circumferential direction. The cage 22 projects axially beyond both ends of the rollers 20, and the portion which projects beyond the large diameter ends of the rollers 20 encircles the thrust rib 26. Nevertheless, it is always spaced outwardly from the outer cylindrical surface 28 on the thrust rib 26.

The bearing B, being a tapered roller bearing, takes axial or thrust loading, as well as radial loading. The thrust loading is applied at the back faces 30 and 36 of the cone 16 and cup 18, respectively, and is transmitted through the rollers 20.

The seal S (FIG. 3) is mounted firmly on the thrust rib 26 of the cone 16 and seals against the front face 38 of the cup 18 and also against the housing bore 8 of the housing 4. In so doing it forms a barrier across the annular space between the cup 18 and cone 16 immediately beyond the large diameter ends of the tapered rollers 20.

Figure 4:
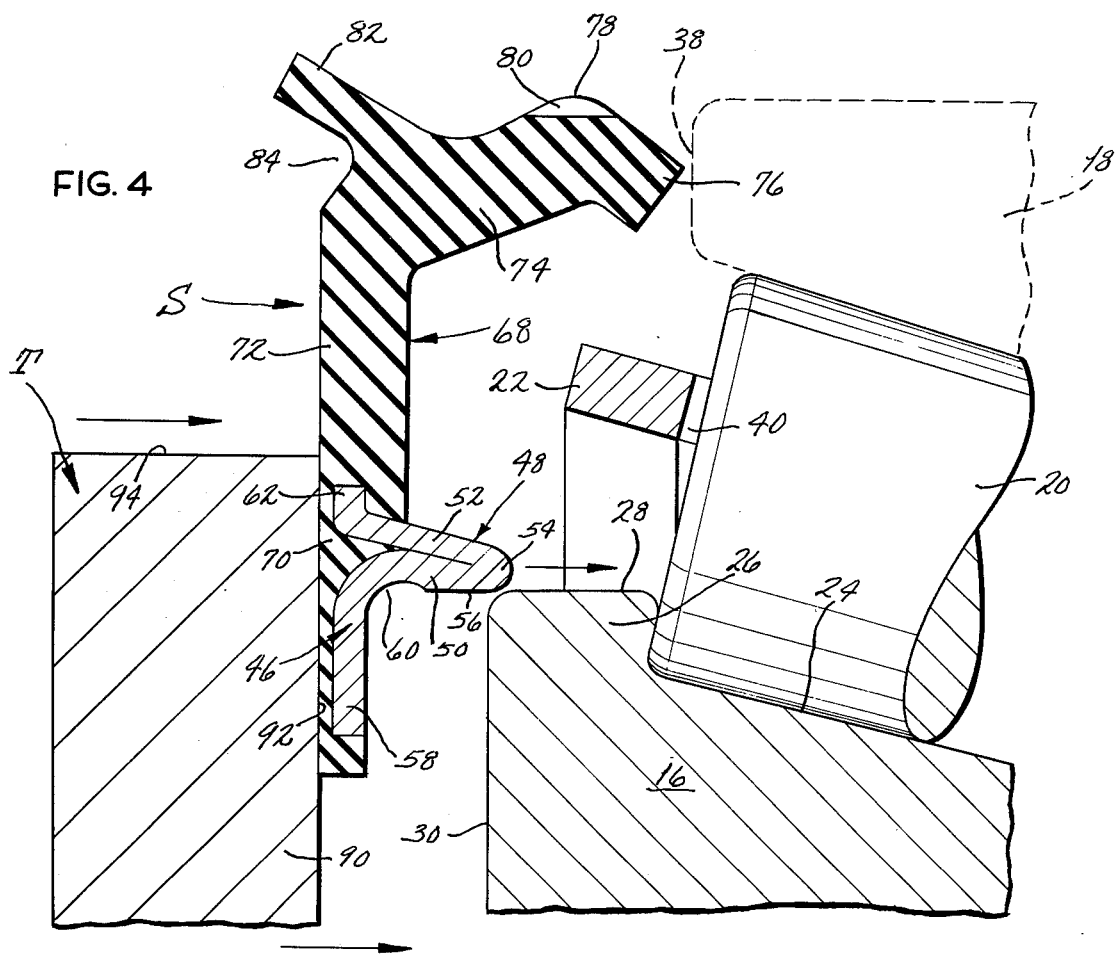
FIG. 4 is an enlarged fragmentary view of the seal; its case being aligned with the thrust rib of the bearing cone prior to the application of an axial installation exerted by an installation tool.

The seal S includes (FIG.4) a seal case 46 which is formed from metal, preferably as a stamping. The seal case 46 in turn includes an axial portion 48 composed of inner and outer segments 50 and 52 which are joined together at a tight bend 54. While the two segments 50 and 52 are not perfectly parallel, the angle between them is quite small, and indeed the two segments 50 and 52 bear against each other near the bend 54. The inner segment 50 has an inwardly presented friction surface 56, which is located adjacent to the bend 54, and this surface is cylindrical, it having a diameter smaller than the diameter of the outer surface 28 on the thrust rib 26 of the cone 16. The diameter should be such that an interference fit of between 0.001 and 0.020 inch and preferably between 0.003 and 0.016 inch is provided. The diameter of the friction surface 56 can be held within close tolerances when the seal case 46 is formed by a stamping operation, and this permits a liberal tolerance in the diameter of the outer surface 28 of the thrust rib 26. Indeed, the tolerance is large enough to obviate grinding of the outer surface 28.

At the other end of the axial portion 48, that is at the end opposite from the tight bend 54, the inner segment 50 merges into an inwardly directed radial flange 58, and at the juncture of the flange 58 and the inner segment 50, the latter may be provided with a relief 60. Here the inside diameter of the inner segment 50 is greater than the diameter of the friction surface 56. The outer segment 52 at its other end merges into an outwardly directed radial flange 62 which is in most instances considerably shorter than the inwardly directed flange 58. Nevertheless, the radially directed surfaces of the two flanges 58 and 62 are coplanar.

When the seal S is installed on the bearing B (FIG. 3), the axial portion 48 of the seal case 46 embraces the thrust rib 26 of the cone 16, while the inwardly directed radial flange 58 bears against the cone back face 30. With the seal case so disposed, the friction surface 56 on the inner segment 50 bears tightly against the outer surface 28 on the thrust rib 26, and a substantial force is required to overcome the friction between the two surfaces 28 and 56. As a result the seal S, once installed on the cone 16, is not easily removed, nor does it work out of position. The inner flange 58 obscures only a portion of the cone back face 30, and does not prevent the abutment 6 from contacting the back face 30.

The seal S further includes (FIG. 4) an elastomeric seal element 68 which is bonded to the seal case 46 and for the most part projects radially outwardly therefrom. It is the seal element 68 which bears against the housing bore 8 and the cup front face 38 to form barriers along those surfaces. The seal element 15 is formed in a molding operation by injecting a suitable elastomer into a mold cavity. The seal case 46 is inserted into the mold cavity prior to the introduction of the elastomer, so that when the elastomer is injected it will bond to the case 46 and of course assume the configuration of the mold cavity.

The elastomeric seal element 68 includes (FIG. 4) a mounting section 70 which is bonded to the back faces of the two flanges 58 and 62 as well as to the opposed faces of the inner and outer segments 50 and 52. Hence, the mounting section 70 occupies the space between the two segments 50 and 52 where those segments diverge. The elastomer of the mounting portion is also bonded to the inside edge of the inner flange 58, and to the outside edge of the outer flange 62, as well as to the adjoining surfaces of the radial flange 62 and the outer segment 52 which are presented toward the interior of the bearing B.

The mounting section 70 merges into a flex section 72 which extends radially outwardly from the end of the short outer flange 62 and closes most of the annular space beyond the large diameter ends of the rollers 20 and the projecting portion of the cage 22. The flex section 72 may be of constant thickness or it may be relieved intermediate its ends to provide somewhat greater flexibility.

Figure 3:
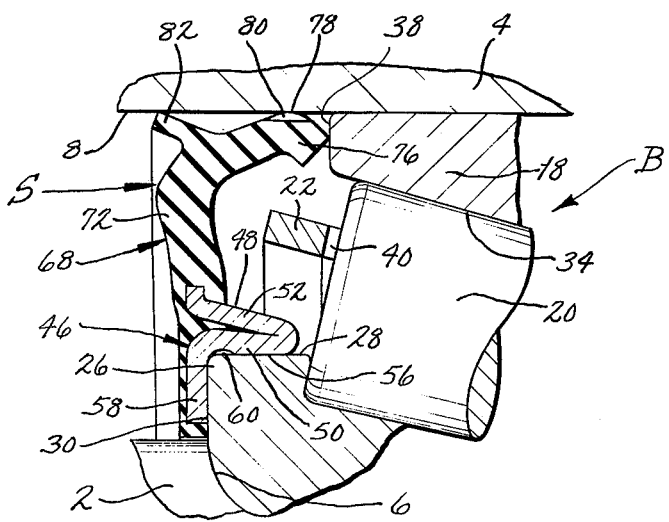
FIG. 3 is an enlarged sectional view of the bearing and the improved seal installed on the bearing.

As its outer end the flex section 72 merges into an axial section 74 which is somewhat oblique to the axis of the bearing B, but nevertheless projects in the same general direction as the axial portion 48 on the seal case 46. Indeed the axial section 74 of the seal element 68 encircles the axial portion 48 of the seal case 46 and projects inwardly beyond it to accommodate the offset between the back face 30 of the cone 16 and the front face 38 of the cup 18. At its end, the axial section 74 has a primary sealing lip 76 which aligns with and bears against the front face 38 of the cup 18 when the seal B is installed on the cone 16 (FIG. 3). The axial section 74 also has a guide lip 78 which projects radially outwardly between the ends of the axial section 74. When the seal element 68 is unrestrained, the outside diameter of the guide lip 78 is slightly less than the diameter of the housing bore 8 to facilitate assembly into the housing bore 8. Preferably it is between 0.000 and 0.030 inch less than the diameter of the housing bore 8. When the seal S is installed on the cone 16, the guide lip 78 expands and bears against the housing bore 8, serving to position the primary sealing lip 76 directly opposite the cup front face 38 against which that lip bears. The guide lip 78 has notches 80 cut into it to vent the interior of the bearing B. Usually about three notches 80 spaced at equal circumferential intervals are sufficient. The notches 80 should be at least 0.015 inch deep.

Almost directly outwardly from the juncture of the flex section 72 and the axial section 74, the latter is provided with a dust lip 82 which projects obliquely outwardly, generally away from the primary sealing lip 76. When unrestrained, the dust lip 82 has a diameter somewhat larger then the housing bore 8. Like the guide lip 78, the dust lip 82 bears against the housing bore 8. The dust lip 82 projects outwardly beyond the end of the flex section 72 and between the two is a groove 84 which provides sufficient flexibility to the dust lip 82 to enable it to easily contract when the seal S is installed in the housing bore 8 (FIG. 3).

It is customary to place the manufacture's trademark and part number on the back face 30 of the cone 16, but the inner flange 58 of the seal case 46 obscures these markings. Nevertheless, since a different seal S is required for each different size bearing B, that information may be molded into the portion of the mounting section 70 which lies behind the back face 30, along with additional numbers to indicate characteristics of the seal S such as its flexibility and the like.

INSTALLATION AND OPERATION

The seal S is installed on the bearing B with an installation tool T (FIG. 4) having an abutment plate 90 with an annular face 92 and an outside surface 94. The annular face 92 of the abutment plate 90 is such that it will fit against the surface of the seal mounting section 70 and the outer surface 94 exceeds the diameter of the outer radial flange 62 of the seal case 46. The annular face 92 is furthermore located directly behind the outer segment 52 of the axial portion 48 or the seal case 46.

The installation of the seal S on the cone 16 of the bearing B occurs before the cone 16 is placed on the shaft or inserted into the cup 18. To install the seal S, the cone 16 is placed against a firm backing, and the axial portion 48 of the seal case 46 on the seal S is brought into axial alignment with the thrust rib 26 at the end of the cone. The seal case 46 will, of course, not pass over the thrust rib 26 since the diameter of the friction surface 56 or inner segment 50 of the axial portion 48 is smaller than the diameter of the cylindrical outer surface 28 on the thrust rib 26. At this point, the installation tool T is brought against the back face of the seal S, it being aligned such that the annular face 92 comes against the surface of the mounting section 70. Hence, the face 92 will be positioned directly behind the radial flanges 58 and 62 on the seal case.

Once the tool T is properly positioned, an axial force is applied to it, and this force is sufficient to overcome the interference fit between the thrust rib 26 of the cone 16 and the inner segment 50 of the axial portion 48 on the seal case 46. As a result the axial portion 48 of the seal case 46 is forced over the thrust rib 26 until the inner radial flange 58 comes against the cone back face 30. While an interference fit will cause a conventional seal case to bell mouth or flare outwardly at its free end upon installation, this does not occur with the seal case 46 due to the doubled back configuration of the axial portion 48, its tight bend 54, and the presence of the outer radial flange 62. In other words the installation force is not only applied at the inner radial flange 58, but is also applied at the outer radial flange 62, and the force component applied at the former is transmitted through inner segment 50 of the axial portion 48 while the force component applied at the latter flange is transmitted through the outer segment 52 to the tight bend 54 where it counteracts any tendency to bell mouth. During installation the inner radial flange 58 is deformed elastically and then plastically in the area adjacent to the juncture with the inner segment 50 of the axial portion 48.

The absence of bell mouthing causes the axial portion 48 to assume a truly axial disposition around the thrust rib 26, and this in turn has three major advantages. First, the seal element 68 assumes the proper angle with respect to the axis of the bearing B and therefore is not cocked backwardly. This enables the primary sealing lip 76 to seal against the cup front face 38 with the proper force when the cone 16, with the seal S installed on it, is inserted into the cup 18 (FIG. 3). Secondly, the friction surface 56 on the inner segment 50 of the axial portion 48 contacts the cylindrical outer surface 28 of the thrust rib 26 for its entire length, thereby providing maximum retention of the seal case 46 on the thrust rib 26. Third, the seal case will accommodate a relatively large tolerance in the diameter of the outer surface 28 on the thrust rib 26 and even some deviation from true roundness. As a result, the outer surface 28 need not be ground to within close tolerances as is the case with the rib-mounted seals heretofore produced. Indeed, the axial portion 48 will accommodate thrust ribs 26 having outer surfaces 28 which provide fits from 0.003 to 0.020 inch tight, while previous rib-mounted seals could only accommodate ribs which provided fits from 0.001 to 0.004 inch tight. Finally, interference fits of a relatively high magnitude may be employed which provide superior retention of the seal case 46 on the thrust rib 26.

The cup 18 is pressed into the housing bore 8 until its back face comes against the shoulder 10 at the end of that bore. Once the seal S is installed on the cone 16, the cone 16 is inserted through the housing bore 8 and into the cup 18. As the seal advances through the housing bore 8 the guide rib 78 moves along the surface of the housing bore 8 and aligns the primary sealing lip 76 with the front face 38 of the cup 18. It further prevents the primary lip 76 from doubling back upon itself as might otherwise occur in the case of a slight misalignment of the cone 16 with respect to the bore 8. After the guide lip 78 enters the housing bore 8, the dust lip 82 moves into the bore 8 and is bent backwardly to conform to the lesser diameter of the bore 8. When the cone 16 is fully installed, that is when the tapered rollers 20 seat against the raceways 24 and 34 of the cone 16 and cup 18, respectively, the primary sealing lip 76 will be against the cup front face 38. Furthermore, the cage 22 projects into the space between the axial section 74 of the seal element 68 and the axial section 48 of the case 46 and the seal element 68 is deflected slightly backwardly. Any variations in the position of the cup front face 38 relative to the cone back face 30 are accommodated, for the most part, in flex section 72 of the elastomeric seal element 68.

In operation, the shaft 2 rotates relative to the housing 4 or vice-versa so that relative rotation occurs between the cone 16 and cup 18. The primary sealing lip 76 bears against and slides along the cup front face 38, forming at that location a barrier which prevents the escape of lubrication. The lip 76 is maintained against the cup front face 38 by the natural resiliency of the elastomer from which the seal element 46 is molded, particularly the portion of the elastomer in the flex section 72. The guide lip 78 moves against the housing bore 8 and keeps the primary lip 76 properly aligned with the cup front face 38. The dust lip 82 bears against and slides along the housing bore 8 so as to prevent contaminants from entering the bearing B.

MODIFICATIONS

This stiffness of the flex section 72 of the seal element 68 may be varied in two ways, and this stiffness to a large measure determines the force at which the primary sealing lip 76 bears against the cup front face 38. First the stiffness may be relaxed by reducing the thickness of the flex section 72 and this may be achieved by forming shallow annular grooves in one or both faces of the flex section 72. Conversely, the stiffness may be increased by thickening the flex section 72. Secondly, the stiffness may be increased by lengthening the outer flange 62 on the seal case 46 and thereby shortening the flex section 72. This would require another stamping die to produce the different seal case, but the same production mold could be used for the seal element. Since the stamping dies is considerably less expensive than production molds, the stiffness, is controlled at the least expensive place.

Figure 5:
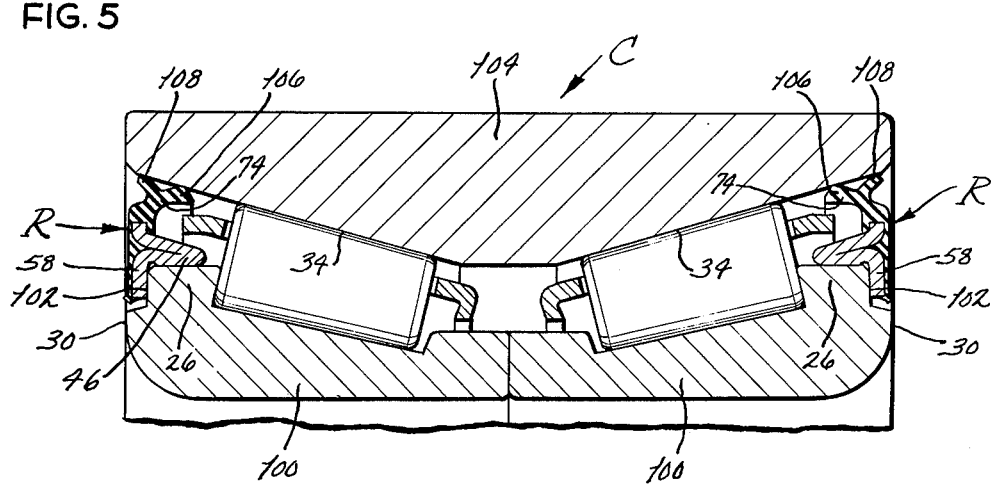
FIG. 5 is a fragmentary sectional view of a double row bearing provided with a modified seal.

The principles of the invention may be utilized in a double row bearing C (FIG. 5) having two cones 100 which abut at their front faces and are practically identical to the cones 16, except for the fact that their thrust ribs 26 have annular recesses 102 which encircle the cone back faces 30. The bearing C also has a double cup 104, the tapered raceway 34 of which extends far enough in the axial direction to encircle the thrust ribs 26 of the cones 100.

The ends of the bearing C are closed by modified seals R which are very similar to the seal S and are installed in a like manner. When the seals R are installed, the inner radial flanges 58 of the seal cases 46 fit into the recesses 102 of the cones 100 such that the backs of the seals R are flush with the back faces 30 of the cones 100. The axial section 74 of each seal R has a primary sealing lip 106 and a dust lip 108, both of which bear against the extension of the tapered raceway 34 on the cup 104.

This invention is intended to cover all changes and modifications of the example of the invention herein chosen for purposes of the disclosure which do not constitute departures from the spirit and scope of the invention.

What is claimed is:

1. A seal for use on a bearing having an inner ring, an outer ring, and rolling elements between the rings, said seal comprising: a seal case formed from metal and having an axial portion and first and second radial flanges, the axial portion extending generally in the direction of the axis of rotation for the bearing and being doubled back upon itself so as to have first and second segments with one of the segments closely overlying the other segment, the first segment being sized to fit tightly in contact with one of the bearing rings, the first radial flange extending in one direction from the first segment of the axial portion such that it will be located along the ring onto which the axial portion is fitted, the second radial flange extending in the opposite direction from the second segment of the axial portion; and a flexible seal element attached to the seal case such that it will extend generally toward the other race of the bearing.

2. A seal according to claim 1 wherein the seal element is bonded to the second radial flange and forms an extension thereof.

3. A seal according to claim 1 wherein the first and second segments are formed integral with each other and are joined together at a bend located remote from the first and second flanges.

4. A seal according to claim 3 wherein the bend is tight enough to enable the first segment of the axial portion to lie against the second segment beyond the bend.

5. A seal according to claim 1 wherein the first axial segment has a relief opening out of the surface thereof which comes against said one ring of the bearing, the relief being located adjacent to the first flange.

6. A seal according to claim 1 wherein the first and second flanges are flush with one another.

7. A seal according to claim 1 wherein the seal element includes a flex section which extends away from the second flange, an axial section extended from the flex section, and a primary sealing lip on the axial section, the primary sealing lip being positioned to bear against the other race of the bearing.

8. A seal according to claim 7 wherein the first segment of the axial portion is sized to tightly embrace the inner ring of the bearing, and the primary sealing lip is positioned to bear against the outer ring.

9. In combination with a tapered roller bearing having a cone, a cup, and a plurality of tapered rollers between the cone and cup, the cone and cup having opposed tapered raceways along which the tapered rollers roll, the cone further having a thrust rib against which the large diameter ends of the rollers bear and a back face located at the end of the thrust rib, an improved seal comprising: a metal seal case including an axial portion having inner and outer segments joined together at a tight bend located at one end of the axial portion, with the inner segment being fitted tightly over the thrust rib on the cone, an inner radial flange attached to and extended radially inwardly from the inner segment of the axial portion such that it is adjacent to the back face of the cone, and an outer radial flange attached to the outer segment of the axial portion and extended radially outwardly therefrom; and an elastomeric seal element bonded to the seal case and including a primary sealing lip which bears against the cup of the bearing.

10. The combination according to claim 9 wherein the seal element further comprises a flex section extending outwardly from the outer flange, the primary sealing lip being carried by the flex section.

11. The combination according to claim 9 wherein the outer surface of the thrust rib is cylindrical; and wherein the outer segment of the axial portion on the seal case lies directly against the inner segment immediately beyond the bend.

12. The combination according to claim 11 wherein the inner segment has an inwardly opening relief located therein adjacent to the first flange.

13. In combination with a bearing having an inner ring, an outer ring and a plurality of rolling elements between the rings, an improved seal comprising: a seal case including an inner axial segment press fitted over the inner race, an outer axial segment joined to the inner segment at one end thereof and closely overlying the inner segment, and a radial flange attached to the inner segment at the opposite end thereof and located opposite the end of the inner ring; the flange and end of the outer axial segment being located such that an axially directed installation force applied to the seal will be transmitted through both the inner and outer segments; and an elastomeric seal element bonded to the seal case and projecting outwardly therefrom generally toward the outer race.

14. The combination according to claim 13 wherein the case further comprises another radial flange attached to the outer ring at the opposite end thereof and extending radially outwardly.

15. The combination according to claim 14 wherein elastomeric seal element is bonded to the two flanges and forms a flat abutment surface along those flanges, with the surface being suitable for applying an axially directed installation force to the seal of sufficient magnitude to force the inner segment over the inner race.

* * * * *